United States Patent
Bhaskaran (10) Patent No.: US 6,266,335 B1
(45) Date of Patent: Jul. 24, 2001

(54) CROSS-PLATFORM SERVER CLUSTERING USING A NETWORK FLOW SWITCH

(75) Inventor: Sajit Bhaskaran, Sunnyvale, CA (US)

(73) Assignee: CyberIQ Systems, San Jose, CA (US)

( * ) Notice: Subject to any disclaimer, the term of this patent is extended or adjusted under 35 U.S.C. 154(b) by 0 days.

(21) Appl. No.: 08/994,709

(22) Filed: Dec. 19, 1997

(51) Int. Cl.⁷ .............................. H04L 12/28; H04L 12/56
(52) U.S. Cl. .............................................. 370/399; 370/389
(58) Field of Search .................................... 370/399, 397, 370/402, 360, 372, 353, 389, 396, 400, 401, 409, 419, 420, 421, 423, 901, 902, 903, 908, 910, 912, 911, 392, 422; 395/115, 182.07, 200.3, 200.31, 200.32, 200.33, 200.48, 200.49, 200.57, 200.68

(56) References Cited

U.S. PATENT DOCUMENTS

| | | |
|---|---|---|
| 5,283,897 | 2/1994 | Georgiadis et al. .................. 395/650 |
| 5,301,226 * | 4/1994 | Olson et al. ....................... 379/88.18 |
| 5,473,599 | 12/1995 | Li et al. ................................. 370/16 |
| 5,513,314 | 4/1996 | Kandasamy et al. ........... 395/182.14 |
| 5,583,940 | 12/1996 | Vidrascu et al. ......................... 380/49 |
| 5,586,121 | 12/1996 | Moura et al. .......................... 370/404 |
| 5,608,447 * | 3/1997 | Farry et al. ............................... 348/7 |
| 5,612,865 | 3/1997 | Dasgupta .............................. 364/184 |
| 5,612,897 * | 3/1997 | Rege ................................ 395/200.49 |
| 5,634,125 | 5/1997 | Li .......................................... 395/619 |
| 5,652,892 * | 7/1997 | Ugajin . |
| 5,655,140 | 8/1997 | Haddock .......................... 395/200.76 |
| 5,666,487 * | 9/1997 | Goodman et al. .................... 709/246 |
| 5,687,369 | 11/1997 | Li .......................................... 395/619 |
| 5,740,375 * | 4/1998 | Dunne et al. .......................... 709/238 |
| 5,754,752 * | 5/1998 | Sheh et al. ............................ 709/227 |
| 5,764,895 * | 6/1998 | Chung ................................... 370/402 |
| 5,774,660 * | 6/1998 | Brendel et al. .................. 395/200.31 |
| 5,774,668 * | 6/1998 | Choquier et al. ..................... 370/480 |
| 5,796,941 | 8/1998 | Lita ................................. 395/187.01 |
| 5,805,804 * | 9/1998 | Laursen et al. ....................... 370/397 |
| 5,812,819 * | 9/1998 | Rodwin et al. .................. 395/500.48 |
| 5,815,668 | 9/1998 | Hashimoto ....................... 395/200.68 |
| 5,835,696 | 11/1998 | Hess .................................. 395/182.08 |
| 5,835,710 * | 11/1998 | Nagami et al. ....................... 709/250 |
| 5,862,338 * | 1/1999 | Walker et al. .................. 395/200.54 |
| 5,920,699 * | 7/1999 | Bare ...................................... 709/225 |
| 5,936,936 * | 8/1999 | Alexander, Jr. et al. ............. 370/395 |
| 5,949,753 * | 9/1999 | Alexander, Jr. et al. ............. 370/216 |
| 5,951,634 | 9/1999 | Sitborn et al. ........................ 709/105 |
| 5,959,990 * | 9/1999 | Frantz et al. .......................... 370/392 |
| 5,999,536 * | 12/1999 | Kawafuji et al. ..................... 370/401 |
| 6,006,264 * | 12/1999 | Colby et al. .......................... 709/226 |
| 6,047,319 * | 4/2000 | Olson ................................... 709/223 |
| 6,097,882 * | 8/2000 | Mogul .................................. 709/201 |
| 6,101,616 * | 8/2000 | Joubert et al. ......................... 714/11 |

FOREIGN PATENT DOCUMENTS

| | | | |
|---|---|---|---|
| 9-321789 | 12/1997 | (JP) ............................... H04L/12/46 |
| WO 99/32956 | 7/1999 | (WO) ............................... G06F/0/00 |

OTHER PUBLICATIONS

Internet. "Quasi–Dynamic Load–Balancing (QDBL) Methods." Apr. 25, 1995, pp. 2 and 5.

* cited by examiner

Primary Examiner—Douglas Olms
Assistant Examiner—Phirin Sam
(74) Attorney, Agent, or Firm—Skjerven Morrill MacPherson LLP; Alan H. MacPherson; Fablo E. Marino (57) ABSTRACT

A network flow switch is provided for connecting a pool of IP routers to a cluster of IP servers sharing a single IP address without requiring translation of the IP address. Rather, all IP servers have the same IP address. The network flow switch routes packets to individual servers by writing the Data Link Layer address of the destination IP server in the destination Data Link Layer address field of the packet. However, no Data Link Layer address translation is required for packets transmitted from the IP servers to the IP routers. Since in a typical client-server environment, the number of packets sent from the server to the client is much greater than the number of packets sent from the client to the server, the Data Link Layer address translation requires very little overall processing time.

35 Claims, 11 Drawing Sheets

CROSS-PLATFORM SERVER CLUSTERING USING A NETWORK FLOW SWITCH

CROSS REFERENCE TO APPENDIX

Appendix A, which is part of the present application, is a set of architectural specifications for a network flow switch, according to one embodiment of the invention.

BACKGROUND OF THE INVENTION

1. Field of the Invention

The present invention relates generally to computer networks and more specifically, to high-bandwidth network switches.

2. Description of the Related Art

The increasing traffic over computer networks such as the Internet, as well as corporate intranets, WANs and LANs, often requires the use of multiple servers to accommodate the needs of a single service provider or MIS department. For example, a company that provides a search engine for the Internet may handle over 80 million hits (i.e., accesses to the company's web page) every day. A single server cannot handle such a large volume of service requests within an acceptable response time. Therefore, it is desirable for high-volume service providers to be able to use multiple servers to satisfy service requests.

For example, the Internet Protocol (IP), which is used to identify computers connected to the Internet and other global, wide or local area networks, assigns a unique IP address to each computer connected to the network. Thus, when multiple servers are used, each server must be accessed using the server's own IP address.

On the other hand, it is desirable for users to be able to access all servers of a service provider using a unique IP address. Otherwise, the users would have to keep track of the servers maintained by the service provider and their relative workloads in order to obtain faster response times. By using a single "virtual" IP address (i.e., an IP address that does not correspond to any one of the IP servers, but rather designates the entire group of IP servers), service providers are able to divide service requests among the servers. By using this scheme, IP servers may even be added or removed from the group of IP servers corresponding to the virtual IP address to compensate for varying traffic volumes. Multiple servers used in this fashion are sometimes referred to as a "cluster."

Figure 1:
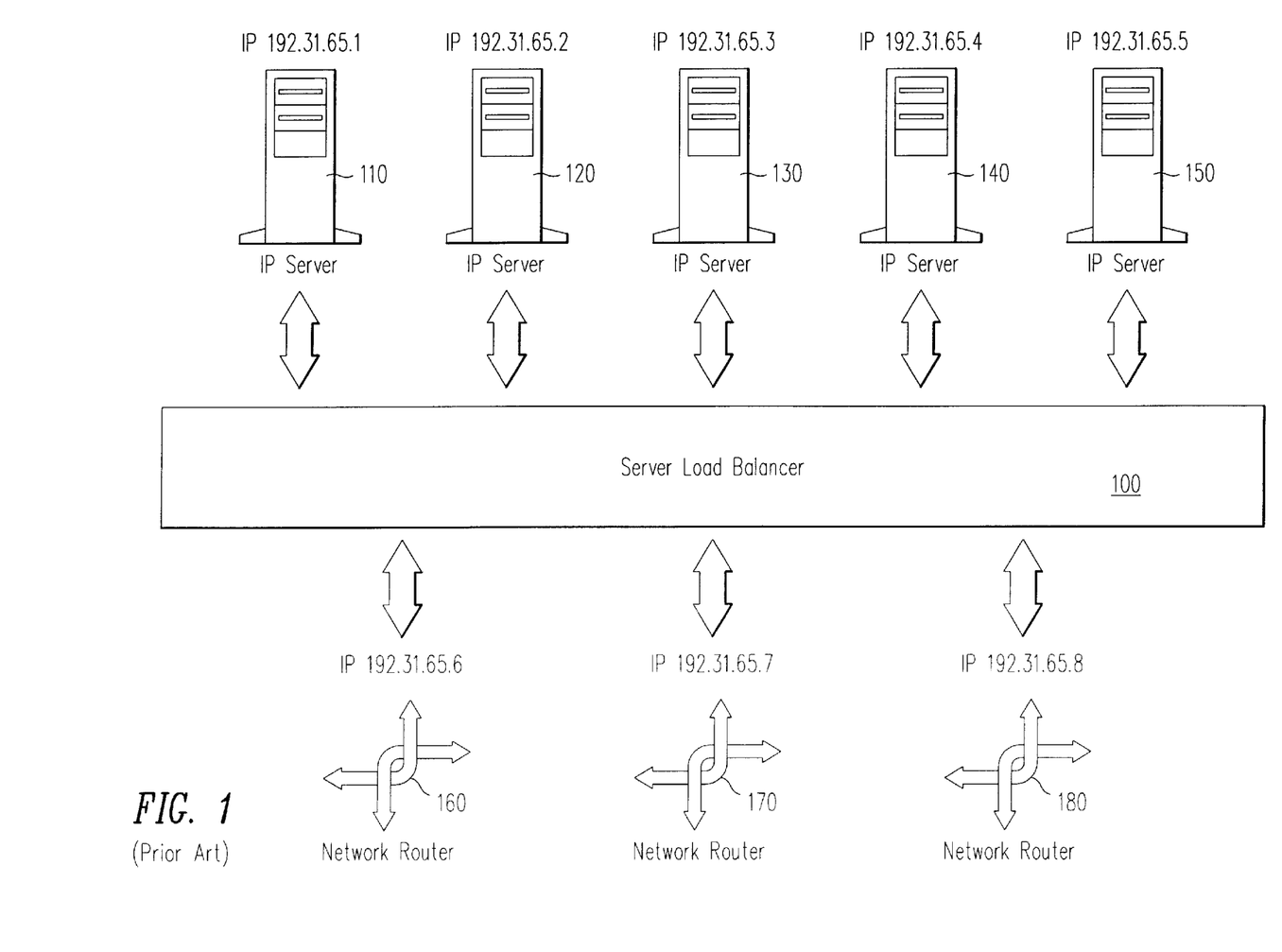
FIG. 1 illustrates a prior art cluster of IP servers, each having a distinct IP address, and a prior art network flow switch for translating a virtual IP addressed shared by all IP servers in the cluster into the individual IP addresses of the IP servers.

FIG. 1 illustrates a prior art cluster of IP servers. A server load balancer 100 routes packets among IP servers 110, 120, 130, 140 and 150 and network routers 160, 170 and 180. Each of IP servers 110, 120, 130, 140 and 150 and network routes 160, 170 and 180 has a distinct IP address; however, any of IP servers 110, 120, 130, 140 and 150 can be accessed via a virtual IP address (not shown) from networks connected to network routers 160, 170 and 180. When a packet addressed to the virtual IP address is received by server load balancer 100, the virtual IP address is translated into the individual IP addresses of one of the IP servers and the packet is routed to that IP server. The translation, however, involves generating a new checksum for the packet and re-writing the source/destination IP address and the checksum fields of the IP header field, as well as of the TCP and UDP header fields. Both the IP header checksum, which is the ISO Layer 3 or Network Layer header, and the TCP or UDP header checksums, which are the ISO Layer 4 or Transport Layer header checksums, need to be recalculated for each packet. Typically, these operations require intervention by a processor of the server load balancer.

When a high volume of requests is processed, the overhead imposed by the translation has a significant impact on the response time of the IP servers. In addition, if a large number of IP servers are used, the time required to perform the translation creates a bottleneck in the performance of the server load balancer, since the IP address of each packet transmitted to and from the IP servers must be translated by the switch. Therefore, there is a need for a faster method for sharing a single IP address among multiple IP servers.

In other cases, when multiple IP addresses are used and a client typically tries to access a primary IP server. If the primary IP server does not respond within a fixed time period, the client tries to access backup IP servers, until a response is received. Thus, when the primary IP server is unavailable, the client experiences poor response time. Current server replication systems such as those used in DNS and RADIUS servers are affected by this problem. There is thus a need for a method of accessing multiple IP servers which does not experience poor response time when the primary IP server is unavailable.

Another potential drawback of the prior art is that each replicated server requires a unique IP address physically configured on the server. Since all IP networks are subject to subnet masking rules (which are often determined by an external administrator) the scalability of the replication is severely limited. For example, if the subnet prefix is 28 bits of a 32-bit IP address, the maximum number of replicated servers is 16 ($2^{(32-28)}$). There is a need for a method of replicating servers that allows replication of IP servers independent of subnet masking rules.

IP version 4 addresses are currently scarce on the Internet, so any method of IP server replication that requires a proportional consumption of these scarce IP addresses is inherently wasteful. For example, an example of prior art is Domain Name Service (DNS) based load balancing. DNS servers are used for resolving a server name (e.g., www.companyname.com) to a globally unique IP address (e.g., 192.45.54.23). In DNS based server load balancing, many unique IP addresses per server name are kept and doled out to allow load balancing. However, this reduces the number of available IP version 4 addresses. There is thus a need for a method of clustering IP servers that minimizes consumption of the scarce IP address space.

Furthermore, when the IP payload of a packet is encrypted to provide secure transmissions over the Internet, IP address translation cannot be performed without first decrypting the IP payload (which contains the TCP or UDP header checksums). In the current framework for IP Security, referred to as IPSEC, the transport layer is part of the network layer payload which will be completely encrypted in a network application that implements IPSEC. IPSEC is described in RFCs 1825–1827 published by the Internet Engineering Taskforce. Encryption is performed by the client, and decryption is performed by the server, using secret crypto-keys which are unique to each client-server link. Therefore when such encryption is performed in client-server communications, as in IPSEC, prior art server load balancers will not be able to perform load balancing operations without violating IPSEC rules. This is because server load balancers cannot access the transport layer information (encrypted as part of the IP payload) without first decrypting the IP payload. Since, the crypto-keys set up between client and server are by definition not public, the IP payload cannot be decrypted by the server load balancer in compliance with IPSEC (indeed, for all practical purposes, the server load balancer will not work at all for encrypted packets).

There is thus a need for a system that not only allows for transmissions of encrypted data packets according to the IPSEC model, but also allows network administrators to perform both server load balancing and IPSEC in their networks. Furthermore, current server load balancers typically operate on TCP packets only. By contrast, IP headers have an 8-bit protocol field, theoretically supporting up to 256 transport protocols at ISO layer 4. There is thus a need for a server load balancing system that supports transport protocols at ISO layer 4 other than TCP (e.g., UDP, IP_in_ IP, etc.).

Prior art systems allow for load balancing and, sometimes, fault tolerance of network traffic only in the inbound direction (i.e., client-router-server). Load balancing and fault tolerance in the reverse (outbound) direction (i.e., server-router-client) is not supported. Specifically if multiple router links are provided for the server to return information to clients, no attempt is made to load balance traffic flow through the router links. Also, when a specific IP server is configured to use a specific default router IP address in the outbound transmissions, no fault tolerance or transparent re-routing of packets is performed when the router fails. There is thus a need for a system that allows for traffic flow clustering services, in both the inbound and the outbound directions.

The prior art solutions are hardware devices configured to appear as IP routers to the cluster of servers being load balanced. As a result, one more classes of IP router devices are added to the router administrator's domain of managed IP routers. This constrains future evolution of the router network, both in terms of adding new vendors' routers in the future and adding new and more sophisticated routing features. Debugging and troubleshooting of routing problems also becomes more difficult. It would thus be preferable to employ a completely transparent piece of hardware, such as a LAN switch or hub, as a load balancing device. In the related art, the servers and any external routers are connected to the load balancing device using shared media Ethernet, (i.e., a broadcast media network). There is a need for a better solution that allows use of switched circuits (e.g., switched Ethernet, SONET), as switched circuits inherently provide (a) dedicated bandwidth and (b) full-duplex (i.e., simultaneous transmit and receive operations) to call connected devices.

SUMMARY OF THE INVENTION

The present invention provides a network flow switch (and a method of operation thereof)for connecting a pool of IP routers to a cluster of IP servers sharing a single IP address, without requiring translation of the IP address, and providing bi-directional clustering. The network flow switch, by operating transparently at the 150 layers 2 and 3, enables cross-platform clustering of servers and routers, these routers being the so-called "first-hop" routers used by the servers to communicate with the outside world. This means the servers within any single cluster can come from any manufacturer of computer hardware and run any operating system (e.g., Microsoft WINDOWS NT, Unix, MACOS). WINDOWS NT is a registered trademark of Microsoft Corp. of Redmond, Wash.; MACOS is a registered trademark of Apple Computer, Inc. of Cupertino, Calif. It also means the routers can come from any vendor of routing equipment. The network flow switch therefore, allows customers freedom of choice in server operating systems as well as router systems in designing their server clustering schemes. The only requirements on these servers and routers is that they all implement standard TCP/1P communications protocols, or some other protocol stack in conformance with the ISO/OSI 7-layer model for computer communications. The network flow switch routes packets to individual servers by writing the Data Link Layer address of the destination IP server in the destination Data Link Layer address field of the packet. Packets transmitted from the IP servers to the IP routers, on the other hand, do not require modification of the Data Link Layer address field.

Since in a typical client-server environment the majority of the packets flowing through the network flow control switch are transferred from the server to the client, eliminating processor intervention in routing outbound packets allows for significant performance enhancements. As a result, the likelihood of the network flow switch becoming a bottleneck is greatly reduced.

Multiple clusters (one or more PI servers sharing a single IP address) are supported in a single network flow switch. On any single link attached to each of the IP servers, multiple clusters can be supported if the IP server's operating system supports multiple IP addresses on a physical link.

In some embodiments, the network flow switch, in addition to routing of the packets, performs load balancing and fault tolerance functions. In these embodiments, a processor of the network flow switch periodically executes a load balancing routine to determine the relative workload of each of the IP servers. When the network flow switch receives a packet destined to the cluster of IP servers, the packet is routed to the IP server with an optimal workload, so as to ensure that the workload is evenly distributed among the IP servers. In addition, if a failure of a network router is detected, a packet addressed to that network router is re-routed to a different network router by re-writing the Data Link Layer destination address of the packet. Since the network flow switch continuously monitors the status of the IP servers, no lengthy time delay is introduced in client-server communications when an IP server is disabled.

Since the IP header is not modified, the network flow switch of the present invention operates on packets encoded according to any ISO layer 4 protocol and, unlike prior art server load balancers, is not limited to TCP encoded packets. In addition, the network flow switch can also handle re-routing, load balancing and fault tolerance of encrypted packets transparently to both server and client.

In some embodiments, load balancing is also performed for outbound packets so as to route packets to the router with an optimal workload.

Thus, a method and apparatus are provided to allow bi-directional clustering for load balancing and fault tolerance in the inbound direction (i.e., client-router-server), as well as in the outbound direction (i.e., server-router-client).

DETAILED DESCRIPTION OF THE INVENTION

The method and apparatus of the present invention allow multiple IP servers to share a same IP address and use a network flow switch to route packets among the IP servers based on the Data Link Layer address of the IP servers (e.g., the destination address of the packets is translated into the Data Link Layer address of one of the IP servers). Since IP networks ignore the source Data Link Layer address field of packets transmitted over the network, Data Link Layer address translation is performed only for packets flowing from an IP client to an IP server. In the reverse flow direction, that is, from an IP server to an IP client, no Data Link Layer address translation is required, thus allowing for very fast throughput through the network flow switch.

Figure 2:
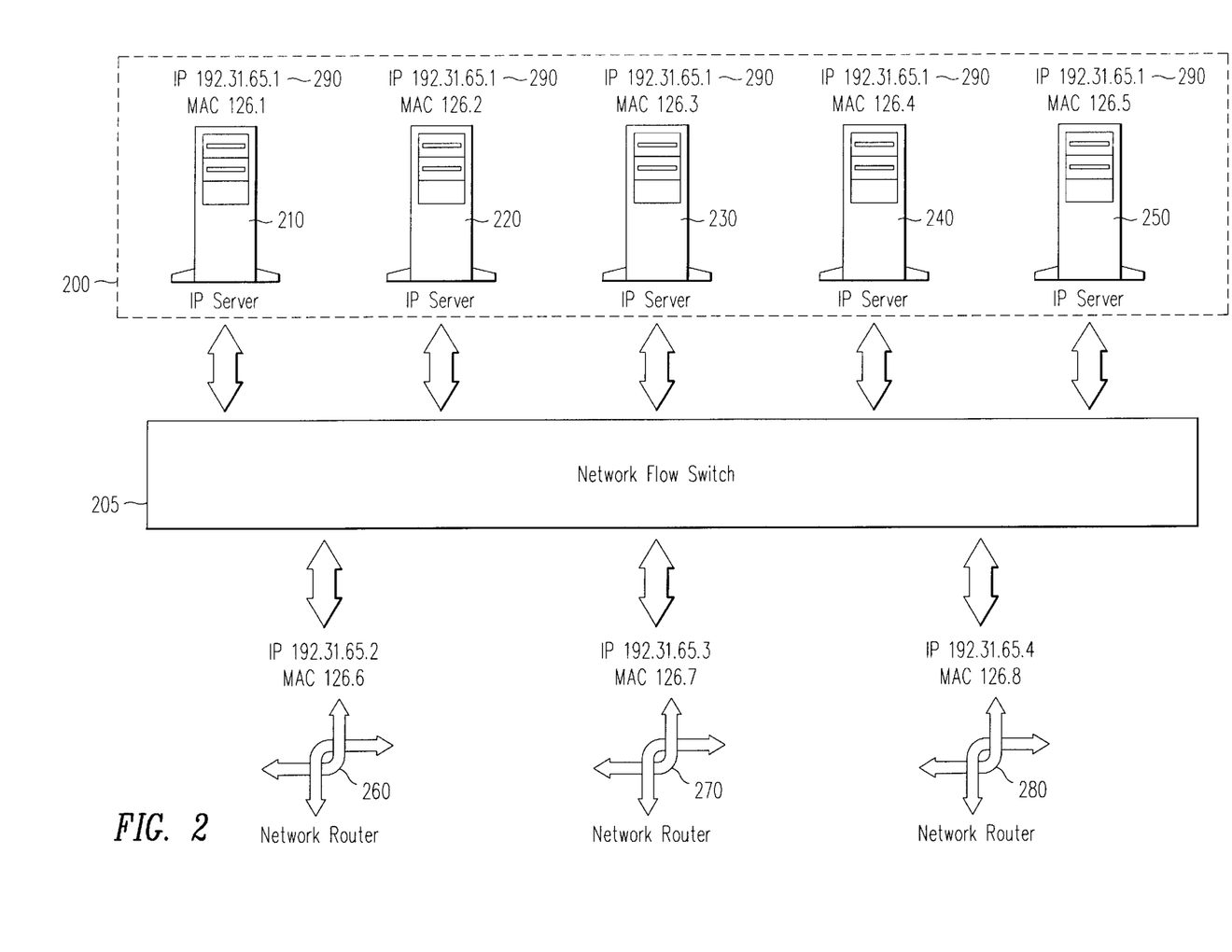
FIG. 2 illustrates a cluster of IP servers and a network flow switch, according to an embodiment of the invention. Each IP server has a same IP address. A Data Link Layer address is used to identify each IP server within the cluster.

A cluster of IP servers 200 and a network flow switch 205, according to an embodiment of the invention, are shown in FIG. 2. Network flow switch 205 routes packets among IP servers 210, 220, 230, 240 and 250 and network routers 260, 270 and 280. IP servers 210, 220, 230, 240 and 250 are configured identically and have a virtual IP address 290. In addition, each of IP servers 210, 220, 230, 240 and 250 has a distinct Data Link Layer address, and a distinct link name. The link name is used to identify the unique server within the cluster of servers sharing a same IP address. As explained below, the Data Link Layer address is used to translate a virtual Data Link Layer address to a physical Data Link Layer address, after an IP server is selected by network flow switch 205 to receive the packet. IP address 290 is visible to devices communicating with the cluster 200, while the individual Data Link Layer addresses of each of the IP servers are not. Network flow switch 205, in fact, performs a proxy Address Resolution Protocol (ARP) function that returns a "virtual" Data Link Layer address (not shown) to a network connected device in response to a standard ARP query. As a result, network connected devices see the cluster 200 as having a single IP address 290 and a single Data Link Layer address (not shown).

Network routers 260, 270 and 280, on the other hand, each have a distinct IP address and a distinct Data Link Layer address. The routers are used to connect cluster 200 to external networks (not shown) via network flow switch 205. Thus, in order to transmit packets of information to cluster 200, a device connected to one of the external networks (e.g., a router) issues a standard ARP query to network flow switch 205 to obtain the virtual Data Link Layer address of cluster 200; network flow switch 205 returns a Data Link Layer address of the selected receiving device (e.g., one of the IP servers) to the requesting device (e.g., the router). The network connected device then transmits a series of packets to network flow switch 205 (e.g., through one of network routers 260, 270 or 280 connected to the external network). The packets are then re-routed by network flow switch 205 to exactly one of IP servers 210, 220, 230, 240 and 250.

Since all embodiments of the network flowswitch ensure that no two servers in the same cluster are on the same flowswitch part, broadcast isolation of the replicated servers is enabled. Therefore, IP address conflicts are avoided by the active intervention of the flowswitch in the event of ARP query packets being received by the network flowswitch, as described above.

Figure 3A:
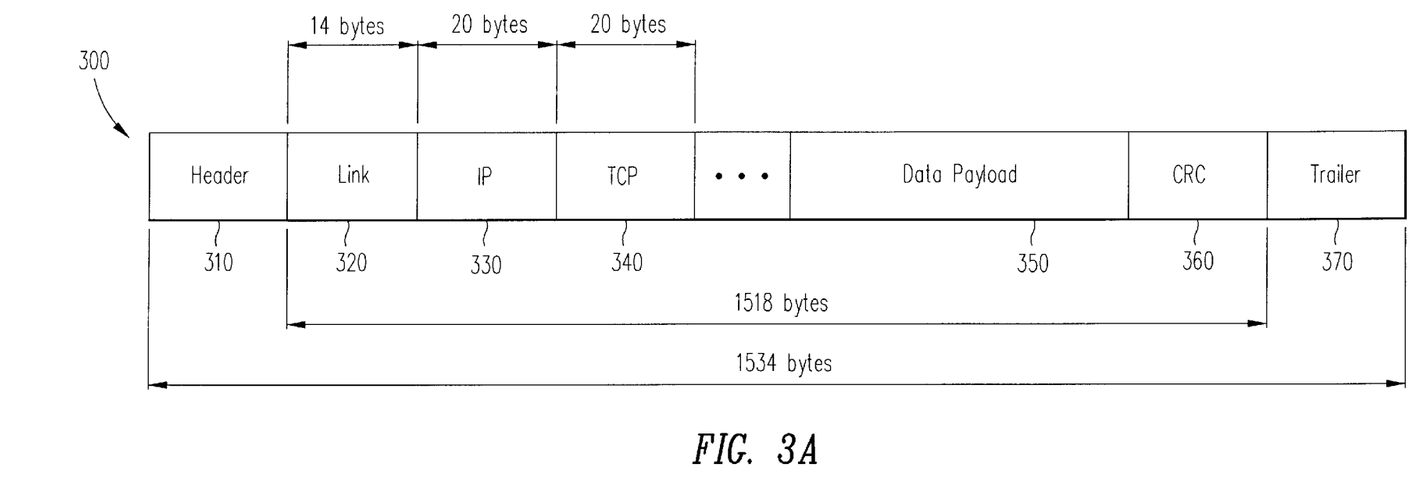
FIG. 3A illustrates the format of a packet routed to/from the cluster of IP servers by the network flow switch 205 of FIG. 2.

The format of a packet 300 transmitted over the external network is illustrated in FIG. 3A. Packet 300 has a header field 310, a link field 320, an IP header 330, a TCP header 340, a data payload 350, a CRC field 360 and a trailer 370. Header 310 and trailer 370 are 8-bit wide private tag-fields: these are not transmitted over the external network but used only inside the network flow switch. IP header 330 and TCP header 340 are standard IP and TCP headers. IP header 330 includes, among other information, a destination IP address and a source IP address for packet 300. CRC field 360 contains a checksum correction code used to verify that packet 300 has been transmitted without error. If IP header 330 were modified, as required by prior art methods for sharing a single IP address among multiple IP servers, the checksum for CRC field 360 would have to be recalculated, an operation requiring processor intervention. In addition, if encrypted information is transmitted according to the IPSEC security framework, decryption of the IP payload is required. Thus, by eliminating the need to recompute the checksum for each packet, the network flow switch of the present invention achieves better throughput than prior art devices. Network owners can further deploy IPSEC security mechanisms transparently and without fear of communications being broken.

Figure 3B:
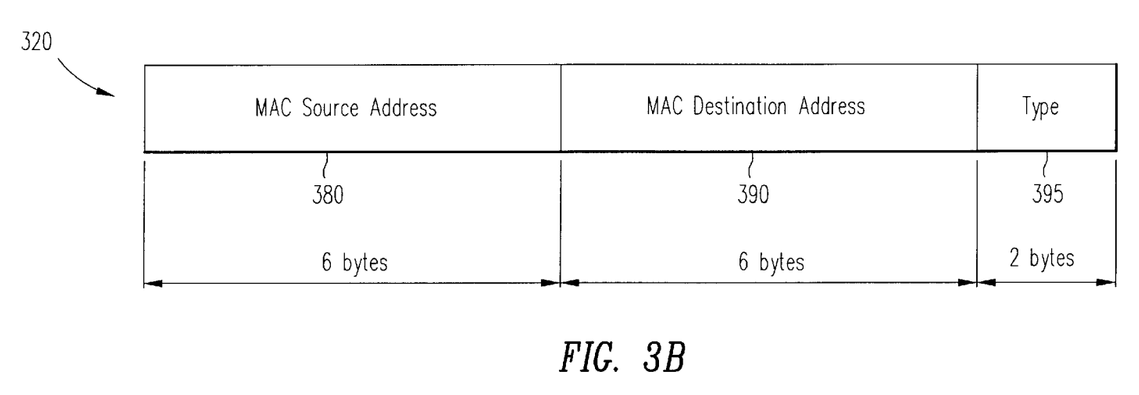
FIG. 3B shows the format of link field 320 of FIG. 3A.

FIG. 3B illustrates the format of link field 320. Link field 320 has a Data Link Layer source address field 380, a Data Link Layer destination address field 390 and type field 395. Since link field 320 is not part of the IP protocol, there is no need to recalculate the checksum for CRC field 360 when link field 320 is modified. Accordingly, re-routing of packets according to the present invention is accomplished by re-writing the Data Link Layer destination address in Data Link Layer destination address field 390 of packet 300. Neither IP header 330 nor CRC field 360 are modified, reducing the processing time required to route packets to and from the cluster of IP servers.

Figure 4A:
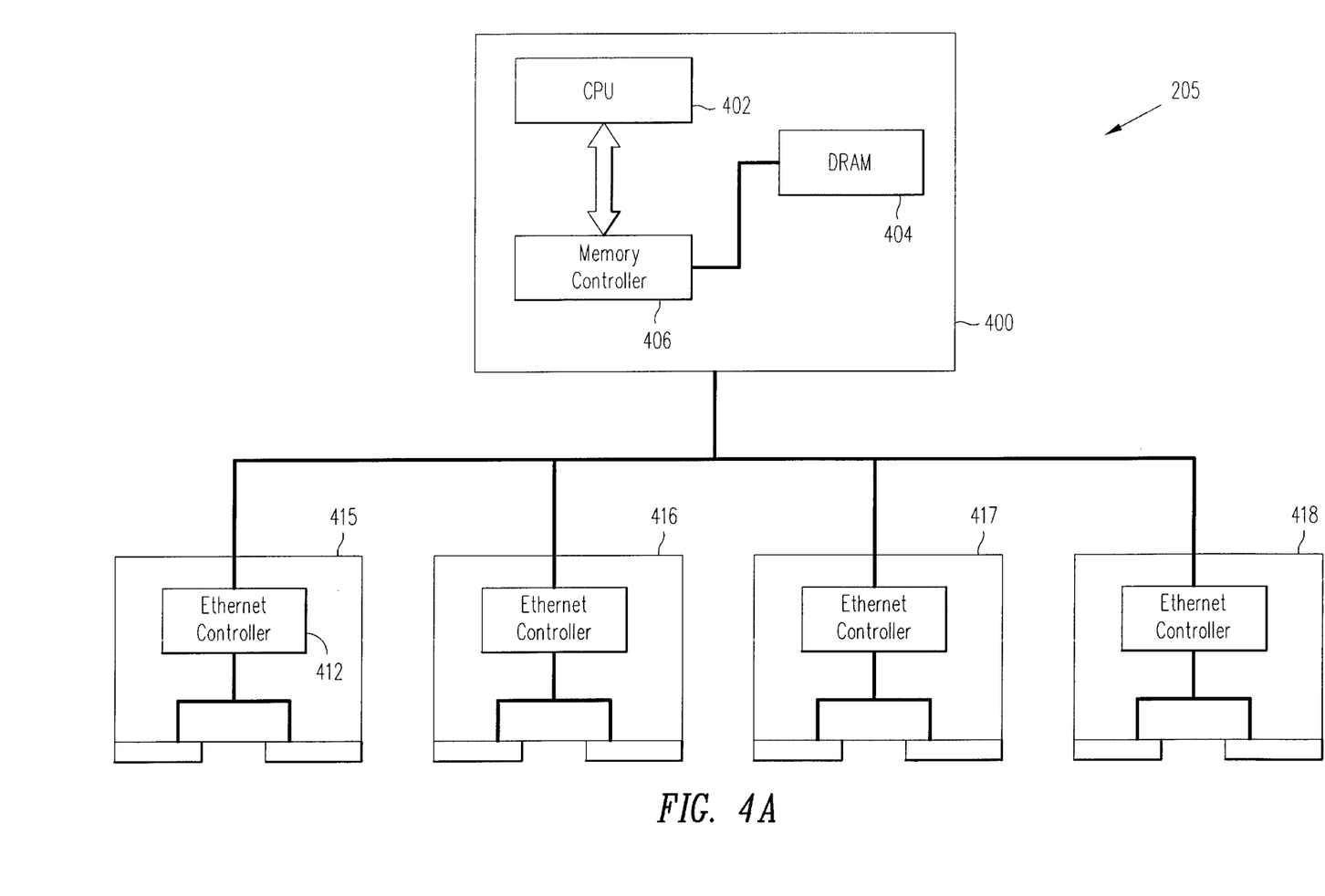
FIG. 4A illustrates the structure of the network flow switch 205 of FIG. 2.

An embodiment of network flow switch 205 (FIG. 2) is illustrated by the block diagram of FIG. 4A. Network flow switch 205 has a CPU board 400 and four ethernet cards 415, 416, 417 and 418 connected by a PCI bus 410. CPU board 400, in turn, has a CPU 402, a memory 404, and a memory controller 406 for controlling access to the memory 404. Each of ethernet cards 415, 416, 417 and 418 has an ethernet controller and two input/output ports 411 and 413.

A network flow switch according to one embodiment of the invention can be constructed entirely from off-the-shelf ASICs (Application Specific Integrated Circuits), controlled by a general purpose CPU executing a software program. Since many commercially available Ethernet switches provide general purpose CPUs for switch management (e.g., for executing SNMP and IEEE 802.1D Spanning Tree Protocols) a network switch according to an embodiment of the invention can be easily implemented on such hardware platforms. The only requirement is that the ASIC be able to support some form of "CPU intervention" triggered when a packet with a particular destination Data Link Layer address is routed through the network flow switch. ASICs that support this form of CPU intervention are available from, among others, Galileo Technology Ltd. of Kormiel, Israel, MMC Networks, Inc. of Sunnyvale, Calif. and I-Cube, Inc. of Campbell, Calif.

Figure 4B:
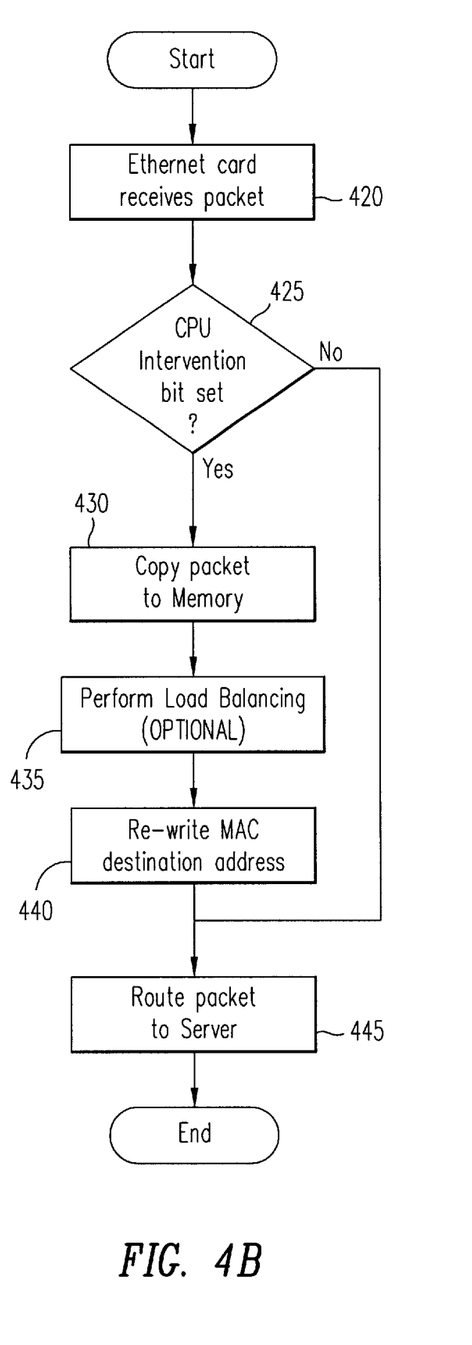
FIG. 4B is a flow diagram of the process of routing packets from one of the network clients to one of the IP servers of FIG. 2 via the network flow switch 205 of FIG. 4A, according to an embodiment of the invention.

The process of routing a packet 300 (FIG. 3A) received by one of network routers 260, 270 or 280 to one of IP servers 210, 220, 230, 240 or 250 of FIG. 2 is illustrated by the flow diagram of FIG. 4B. Initially, a packet is received on a port of one of ethernet cards 415, 416, 417 or 418, in stage 420. In stage 425, ethernet controller 412 then checks a CPU intervention bit to determine whether the packet needs to be sent to the CPU board 400 for further processing. In such a case the packet is transferred to CPU board 400 over PCI bus 410 and stored in memory 404 by memory controller 406, in stage 430. If the CPU intervention bit is not set, however, the processing proceeds to stage 445. Stage 435 performs an optional load balancing operation to determine which of IP servers 210, 220, 230, 240 or 250 packet 300 is to be routed to. The load balancing operation of stage 435 attempts to divide packets to be processed among the IP servers according to the capacity and the current utilization of each server. A load balancing scheme suitable for use in the present invention is described in a related application titled "DYNAMIC LOAD BALANCER FOR MULTIPLE NETWORK SERVERS" by Sajit Bhaskaran and Abraham Matthews, having Ser. No. 08/992,038, which is herein incorporated by reference in its entirety. Stage 440 then rewrites the Data Link Layer destination address field of packet 300 to indicate which of IP servers 210, 220, 230, 240 or 250 packet 300 is to be routed to. Finally, the packet is transferred the one of ethernet cards 415, 416, 417 or 418 to which the IP server specified by the Data Link Layer destination address field of packet 300 is connected, in stage 445.

Figure 4C:
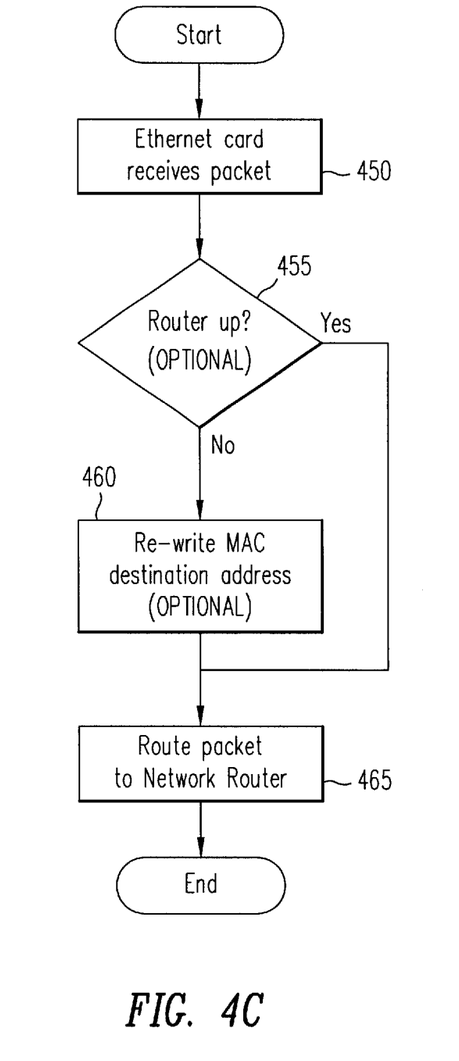
FIG. 4C is a flow diagram of the process of routing packets from one of the IP servers to one of the network clients of FIG. 2 via the network flow switch 205 of FIG. 4A, according to an embodiment of the invention.

The process of routing a packet 300 (FIG. 3A) from one of IP servers 210, 220, 230, 240 or 250 to one of network routers 260, 270 or 280 (FIG. 2) is illustrated by the flow diagram of FIG. 4C. Initially, a packet is received on a port of one of ethernet cards 415, 416, 417 or 418 connected to one of IP servers 210, 220, 230, 240 or 250, in stage 450. Optional stage 455 then checks whether the network router to which the packet 300 is to be routed is in service, in which case processing proceeds with stage 465. A fault tolerance scheme suitable for use in the present invention is described in a related patent application titled "ROUTER POOLING IN A NETWORK FLOWSWITCH" by Sajit Bhaskaran, having Ser. No. 08/994,405, which is herein incorporated by reference in its entirety. Otherwise, in optional stage 460, ethernet controller 412 transfers packet 300 over PCI bus 410 to CPU board 400 and memory controller 406 stores packet 300 in memory 404. Still in stage 460, CPU 402 re-writes Data Link Layer destination address field 390 of packet 300 to indicate which of network routers 260, 270 or 280 packet 300 is to be routed to. Finally, memory controller 406 transfers packet 300 over PCI bus 410 to one of ethernet cards 415, 416, 417 or 418, depending on the contents of Data Link Layer destination address field 390 of packet 300, in stage 465.

In some embodiments, the network flow switch provides load balancing and clustering for outbound packets. In such case, the network routers are grouped in "router pools," just as IP servers were grouped in clusters for inbound processing. Traffic from IP servers going to IP clients is load balanced if multiple network routers and/or multiple network router links are present. For example, if four network routers each with a 100 Mbps Ethernet port are connected to the network flow switch traffic is approximately load balanced on the four links, allowing a throughput of nearly 400 Mbps, even if all the IP servers are each configured with a single and identical default router IP address.

This is achieved by programming the network flow switch to respond to ARP requests from the IP servers for a particular network router's IP address as follows. The network flow switch keeps track of the load going to all network routers in a router pool (e.g., by keeping track of <in packets, out packets, in bytes, out bytes> vectors). The IP servers maintain ARP caches of the IP address of the network routers. The ARP cache is updated by periodically issuing an ARP request for a network router's IP address. The network flow switch intercepts the request, examines the IP server's IP address, and responds to the request by assigning the Data Link Layer address of the network router in the pool that is best able to service the load coming from this particular server ("best" is determined by measures of real time traffic load or using a simple round robin scheme based on server source IP addresses).

For purposes of outbound load balancing, unlike for inbound load balancing, network routers are configured with unique IP addresses, rather than a single IP address.

In some embodiments, the network flow switch can be configured to perform only "availability clustering." In availability clustering, one server is serves as the primary IP server, while all other IP servers in the cluster act as secondary IP servers—at any given time (secondary-operational or secondary-failed). Traffic is always routed to the primary IP server. If the primary IP server fails, the failure is automatically detected by the network flow switch and the failed IP server's status is converted to "secondary-failed." One of the available IP servers in state "secondary-operational" is then converted to state "primary". The network flow switch continues to monitor the state of servers in "secondary-failed" state and automatically detects when they becomes operational again. When this happens, their status is changed to "secondary-operational". Therefore, a failed primary IP server which is restored after being in "secondary-failed" state for some time never pre-empts the current primary, but rather goes into "secondary operational" state.

In addition, the status of every network router in a router pool is monitored. If the network router fails, all traffic directed to that network router is transparently re-directed to another network router in the router pool until the network router is restored. No intervention from the IP servers is necessary, as the re-direction is handled entirely by the network flow switch.

Figure 5A:
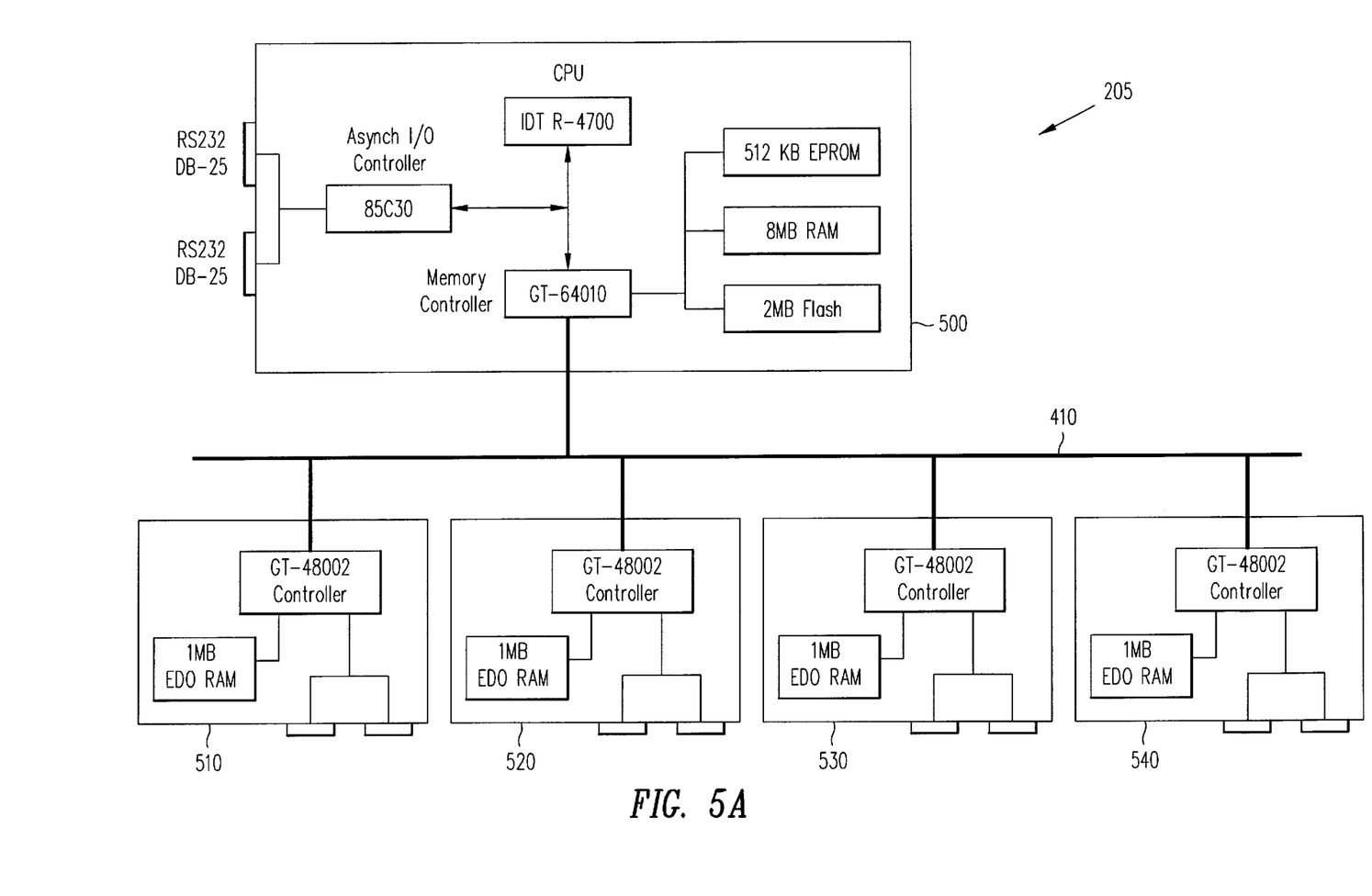
FIG. 5A is a block diagram of a network flow switch implemented using multiple general-purpose circuit boards, according to an embodiment of the invention.
Figure 5B:
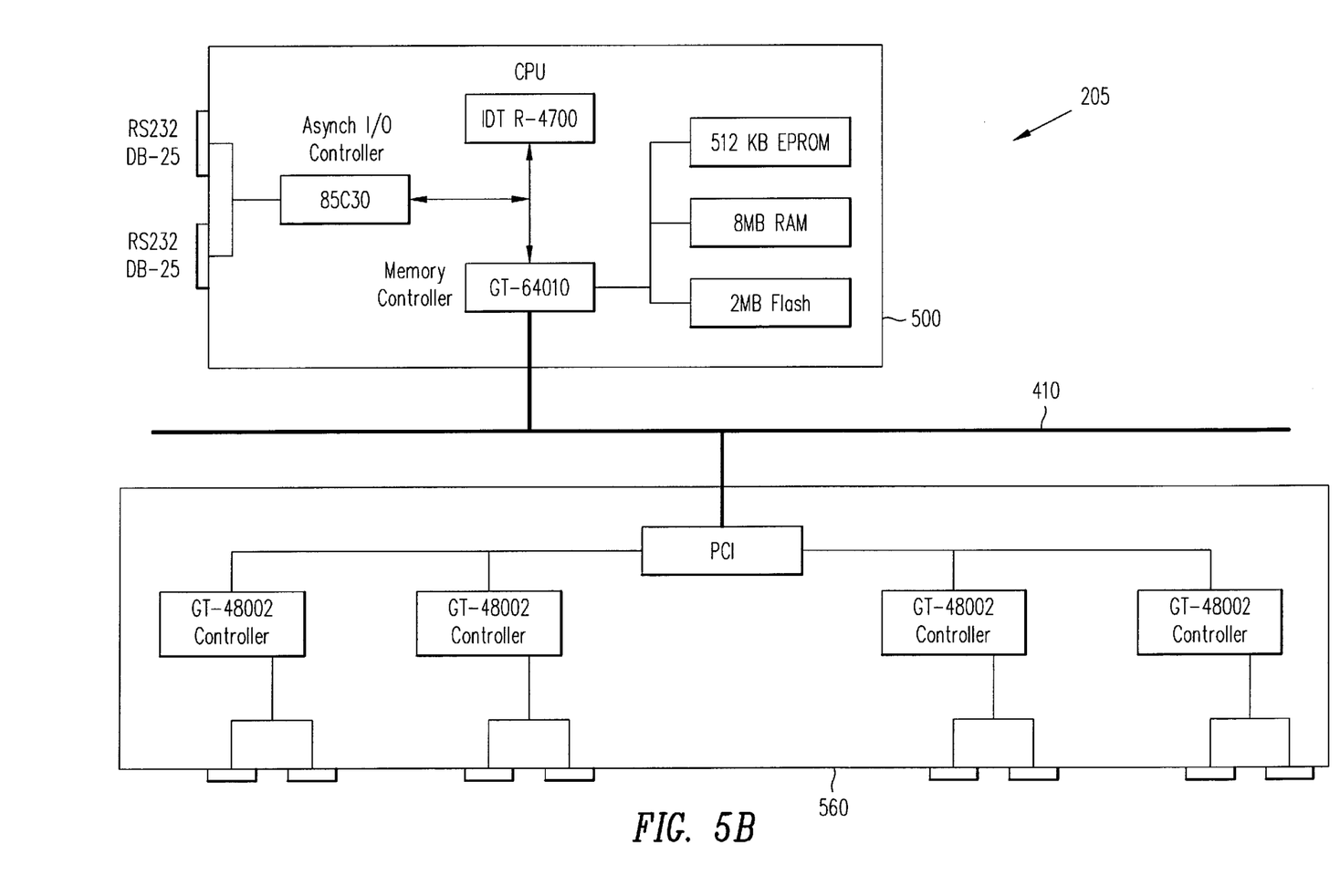
FIG. 5B is a block diagram of a network flow switch implemented using a general-purpose CPU board and a special-purpose network board, according to an embodiment of the invention.
Figure 5C:
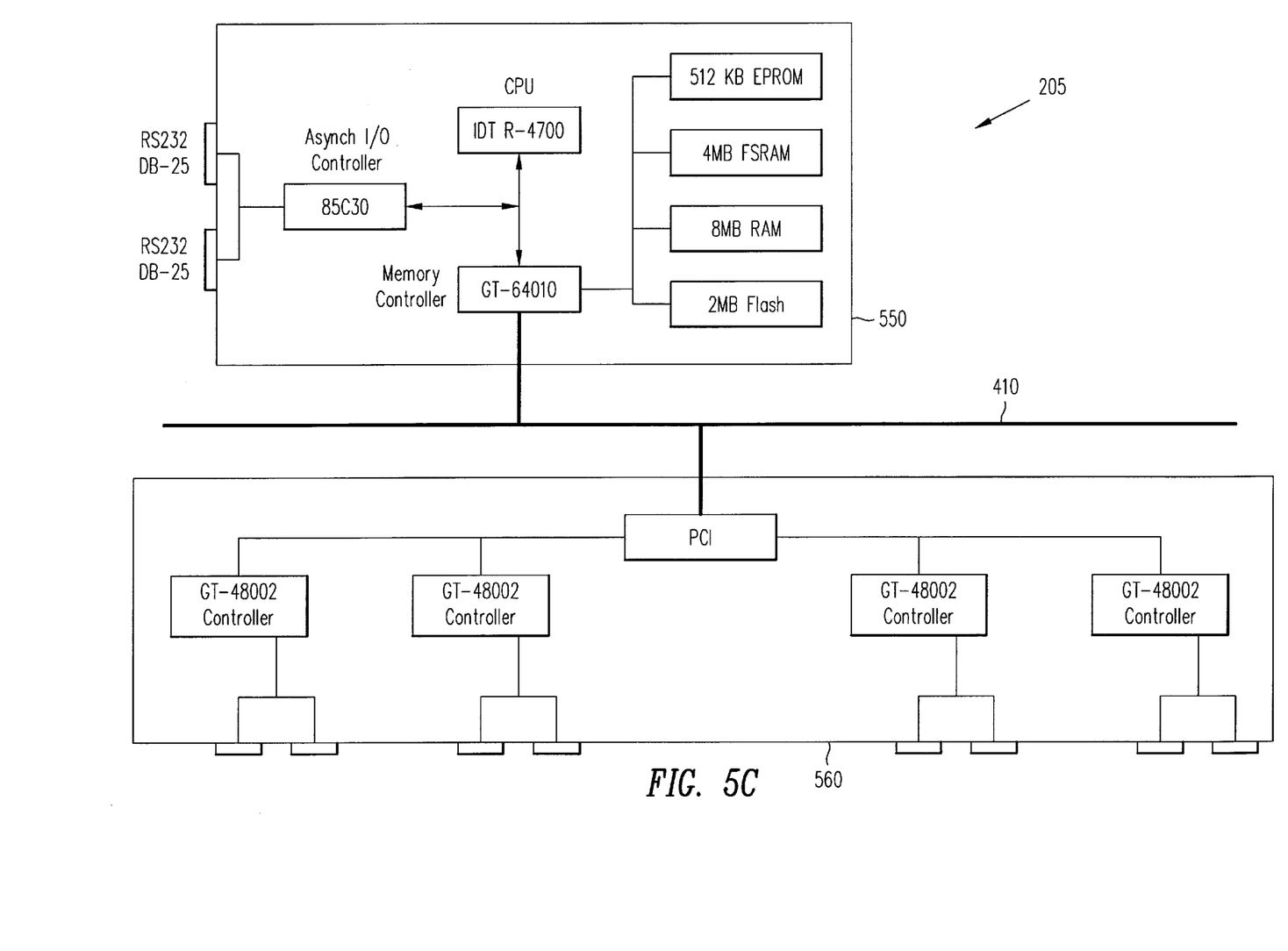
FIG. 5C is a block diagram of a network flow switch implemented using two special-purpose circuit boards, according to an embodiment of the invention.

FIGS. 5A–5C illustrate several possible hardware implementations of network flow switch 205 (FIGS. 2 and 4A).

Each of the hardware implementations of FIGS. 5A–5C represents a different trade-off between ease of implementation and performance of the network flow switch. For example, the hardware implementation of FIG. 5A does not require any special purpose hardware and can be implemented using off-the-shelf components.

In FIGS. 5A–5D, the CPU is a model R-4700 processor, available from Integrated Device Technology, Inc. of San Jose, Calif., the memory controller is a model GT-64010 controller, available from Galileo Technologies Ltd. of Karmiel, Israel and the ethernet controllers are model GT-48002 ethernet controllers, also available from Galileo Technologies. While this specific hardware components are described for clarity, the invention is not limited to the specific components, manufacturers or model numbers. Other components made by different manufacturers and having different model numbers can be used in place of the components described in FIGS. 5A–5C.

FIG. 5A shows a first hardware implementation of network flow switch 205 having a CPU board 500 and several ethernet cards 410, 420, 430 and 440. CPU board 500 has an R-4700 processor connected to an 85C30 asynchronous I/O controller and to a GT-64010 memory controller. The asynchronous controller is in turn connected to a pair of RS232/DB-25 input/output ports for interfacing with other devices. The memory controller, in addition to PCI bus 410, is connected to a 512 KB EPROM, an 8 MB RAM and a 2 MB FLASH memory. Ethernet cards 510, 520, 530 and 540 have a GT-48002 ethernet controller, a 1 MB EDO RAM and a pair of input/output ports. CPU board 500 and ethernet cards 510, 520, 530 and 540 are general purpose circuit boards available from Galileo Technologies. As a result, network flow switch 205 can be implemented using only general-purpose components, as illustrated in FIG. 5A.

FIG. 5B illustrates a second hardware implementation of network flow switch 205 (FIGS. 2 and 4A). In FIG. 5B, a special-purpose network card 560 is used in place of the general-purpose network cards of FIG. 5A. Thus, Ethernet cards 510, 520, 530 and 540 are replaced by a single network card 560. Network card 560, in turn, comprises several ethernet controllers each connected to a pair of input/output ports, as well as an on-board PCI bus. The external PCI bus of FIG. 5A is eliminated altogether. The hardware implementation of FIG. 5B provides improved performance and cost reduction over the hardware implementation of FIG. 5A, at the cost of adding special-purpose hardware.

FIG. 5C illustrates a third hardware implementation of network flow switch 205 (FIGS. 2 and 4A). In FIG. 5C, two special-purpose circuit boards are used in place of the general-purpose circuit boards of FIG. 5A. CPU board 550 has the same components as CPU board 500 of FIG. 5A, except that a 4 MB FSRAM is added. In addition, a content addressable memory (CAM) and fast PLDs could be added to speed up the performance of CPU board 550. Ethernet cards 510, 520, 530 and 540, however, are replaced by a single network card 560, as explained with respect to FIG. 5B. The hardware implementation of FIG. 5C provides improved performance over the hardware implementation of FIGS. 5A and 5B (i.e., support for 100 Mbps transfer rates and faster CPU performance), at the cost of adding special-purpose hardware.

Figure 5D:
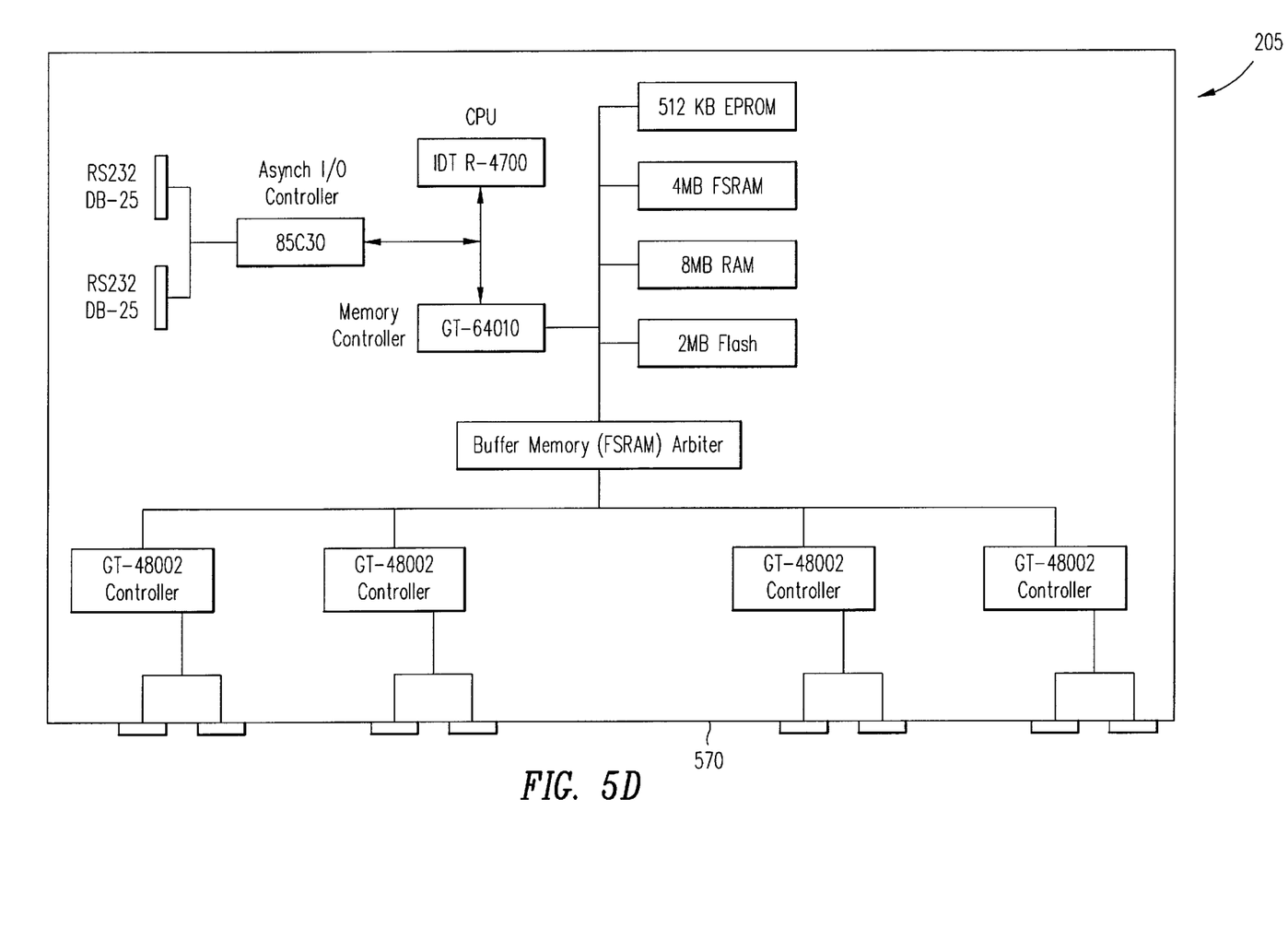
FIG. 5D is a block diagram of a network flow switch implemented using a single special-purpose circuit board, according to an embodiment of the invention.

FIG. 5D illustrates yet a third hardware implementation of network flow switch 205 (FIGS. 2 and 4A) in which the entire switch is provided on a single circuit board 570. Circuit board 570 has all the components of CPU board 550 and network card 560 of FIG. 5C, except that the on-board PCI bus is replaced by a Buffer Memory Arbiter. Eliminating the PCI bus allows for further improved performance (transfer rates in excess of 1 Gbps), at the cost of more expensive special-purpose hardware.

Figure 5E:
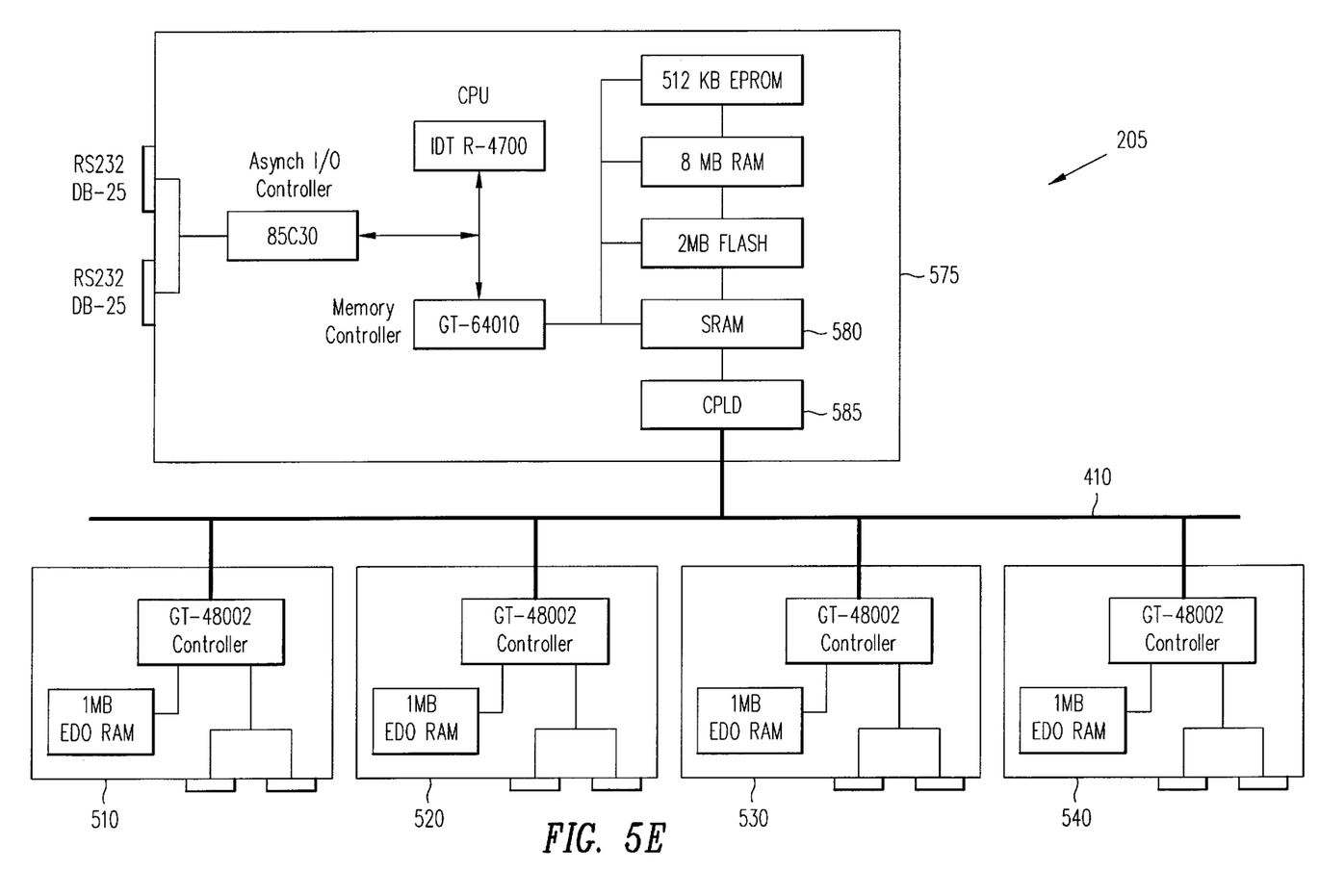
FIG. 5E is a block diagram of a network flow switch implemented using a combination of special-purpose and general purpose circuit boards, according to an embodiment of the invention.

FIG. 5E illustrates a further hardware implementation of network flow switch 205 (FIGS. 2 and 4A) using a special-purpose circuit board 575 in combination with ethernet cards 510, 520, 530 and 540 (FIG. 5A). Circuit board 575 has the same components as circuit board 500 of FIG. 5A, except that a CPLD 585 and a dual-port SRAM 580 are added. Circuit board 575 is connected to ethernet cards 510, 520, 530 and 540 via PCI bus 410. In this embodiment, Data Link Layer address translations are performed by CPLD 585, rather than by CPU R-4700, allowing for faster processing of packets. CPU R-4700 still performs management tasks, such as periodically checking the loads on each of the IP servers, detecting failures of IP servers and network routers, etc.

Figure 5F:
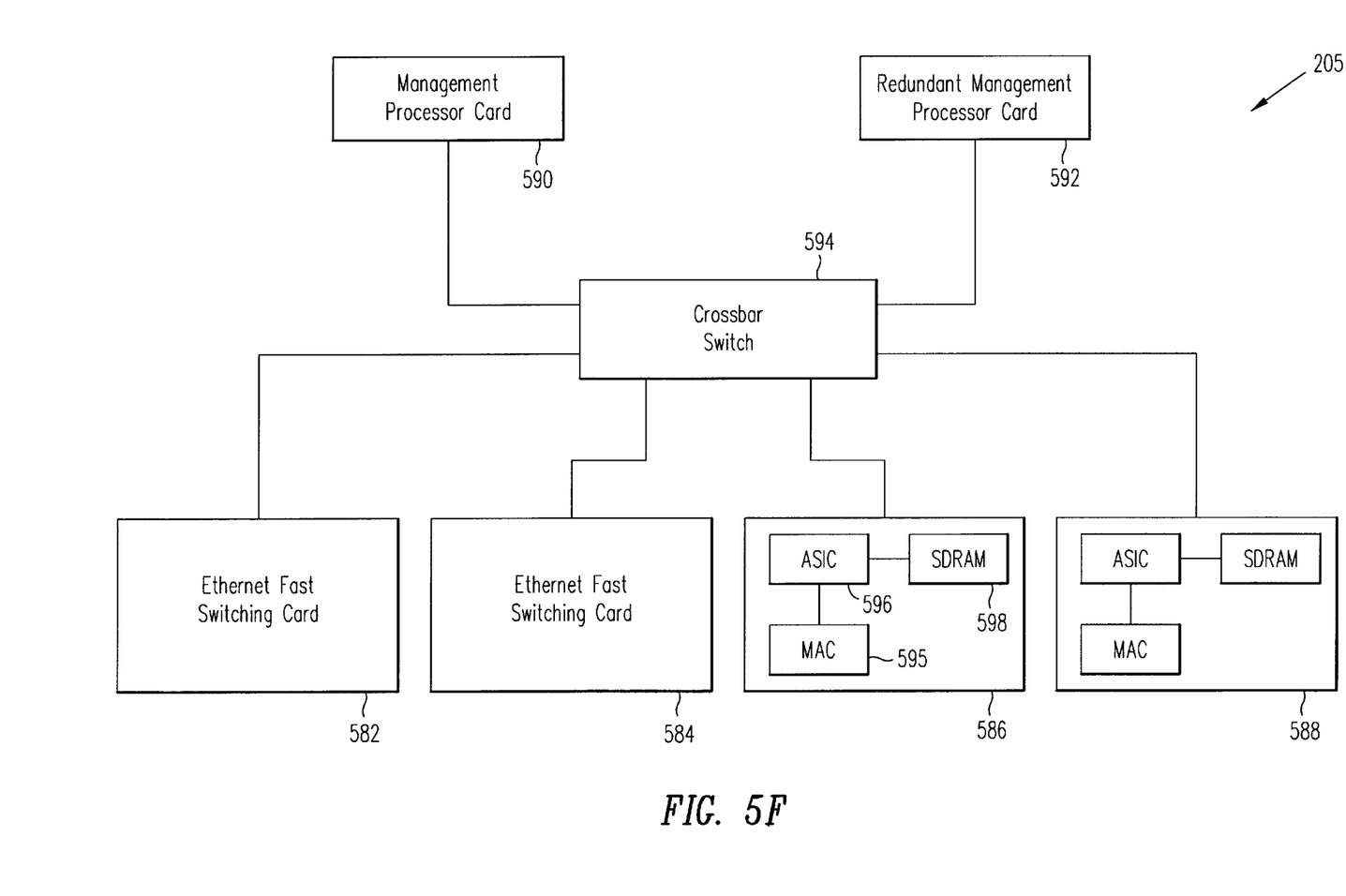
FIG. 5F is a block diagram of a network flow switch implemented using a crossbar switch, according to an embodiment of the invention.

FIG. 5F illustrates a further hardware implementation of network flow switch 205 (FIGS. 2 and 4A) using a crossbar switch in place of PCI bus 410. In FIG. 5F, crossbar switch 594 connects management processor cards 590 and 592 to ethernet cards 582 and 584, as well as circuit cards 586 and 588. Each of circuit cards 586 and 588 includes an ASIC 596 connecting a look-up table 598 with a Data Link Layer chip 595. In this embodiment, management processor cards 590 and 592 are used to perform management tasks as explained above with respect to FIG. 5E, ethernet cards 582 and 584 are used for outbound flow of packets as descried with respect to FIG. 5A and circuit cards 586 and 588 are used to translate the Data Link Layer address fields of inbound packets. This is achieved by extracting the destination Data Link Layer address field of the packet in Data Link Layer chip 595 and performing a fast look-up of look-up table 598, in which the Data Link Layer address of the IP server with an optimal load is stored. Data Link Layer chips suitable for use in this invention are available, among others, from Galileo Technologies, I-Cube and MMC Networks. If network router fault tolerance is provided, circuit cards 586 and 588 are also used to translate the Data Link Layer address field of outbound packets that are re-routed due to a network router failure.

To increase performance, each of IP servers 210, 220, 230, 240 and 250 and crouters 260, 270 and 280 should be connected (either directly or via a network) to network flow switch 205 via a switched port with dedicated full duplex bandwidth. However, network flow switch 205 (FIGS. 2 and 4A) functions properly even in case it is connected to one of the IP servers via a shared media port. Each of IP servers 210, 220, 230, 240 and 250, thus, is configured differently depending on whether the server is connected to network flow switch 205 via a shared instead of a switched port. Each IP server is configured automatically at start-up time by executing a computer program on the server.

In one embodiment of the invention, all or some of the routers and servers are connected using switched circuits using switched circuits at the data link layer. This provides each device connected to the flowswitch (a) dedicated bandwidth and (b) full duplex operation. Those skilled in the art, however, will realize that the network flowswitch of the present inventions can also be applied to non-switched enviroments (e.g., shared media Ethernet hubs or shared ports using cascaded Ethernet switches).

Embodiments described above illustrate but do not limit the invention. In particular, the invention is not limited to any particular hardware used to implement the network flow control switch. The invention, however, is not limited to any particular number of ethernet cards or to any particular kind of processor, memory controller or bus. In particular, any number of ethernet cards, with an arbitrarily large numbers of physical link ports, can be used in accordance to the present invention. Processors other than the R-4700 and the GT-64010 can be used in accordance to the invention. Ethernet switching ASICs other than the Galilieo GT-48002A can be used, from Galileo or other vendors, such as I-Cube or MMC Networks. Furthermore, a single processor may be used in place of CPU 402 and memory controller 406 (FIG. 4A). Buses other than a PCI bus (e.g. SCSI buses) or even crossbar switches can be used in place of a PCI bus 410 (FIG. 4A). Finally, network cards other than ethernet cards can be used in place of ethernet cards 415, 416, 417 and 418 (FIG. 4A). Furthermore, the invention is not limited to any type or number of network cards. In fact, the invention can be applied to an arbitrary number of network cards connected to an arbitrary number of networks. Other embodiments and variations are within the scope of the invention, as defined by the following claims.

What is claimed is:

1. A network flow switch for routing packets to and from a plurality of IF servers, the switch comprising:
   a processor;
   a memory connected to the processor; and
   a plurality of network ports connected to a network;
   wherein a packet received on a first network port is routed to a second network port by writing a Data Link Layer address of one of the IP servers into the packet in the network flow switch, wherein each of the IP servers has a same IP address and a Data Link Layer address that differs from the Data Link Layer address of the other IP servers.

2. The switch of claim 1, wherein the processor and the memory are part of a single circuit board.

3. The switch of claim 2, wherein the circuit board further comprises an I/O controller and a memory controller.

4. The switch of claim 1, wherein the network ports are part of a single circuit board.

5. The switch of claim 1, wherein the processor and the memory are part of a general-purpose circuit board.

6. The switch of claim 1, wherein the network ports are part of a general-purpose circuit board.

7. The switch of claim 1, wherein the processor and the memory are part of a special-purpose circuit board.

8. The switch of claim 1, wherein the network ports are part of a special-purpose circuit board.

9. The switch of claim 1, wherein each network port further comprises a controller and a memory.

10. The switch of claim 1, further comprising one or more ASICs.

11. The switch of claim 1, wherein routing packets from one of the IP servers to a network destination does not require intervention by the processor.

12. The switch of claim 1, wherein an IP payload of the packet received on the first network port is encrypted.

13. The switch of claim 1, wherein the packet is encoded according to an ISO layer 4 transport protocol other than TCP.

14. A method for routing packets to and from a plurality of IP servers, the method comprising:
    receiving a packet in a network flow switch corresponding to an IP address of the IP servers; and
    routing the packet to at least one of the IP servers by writing the destination Data Link Layer address of the IP server into the packet in the network flow switch, wherein each of the IP servers has a same IP address and a Data Link Layer address that differs from the Data Link Layer address of the other IP servers.

15. The method of claim 14, wherein the packet is routed to only one of the IP servers.

16. The method of claim 14, wherein if a first IP is disabled, the packet is routed to a second IP server.

17. The method of claim 16, wherein routing the packet to the second IP server further comprises writing the Data Link Layer address of the second IP server into the packet.

18. The method of claim 14, wherein the packet is routed to an IP server having an optimal workload.

19. The method of claim 18, wherein routing the packet to the IP server further comprises writing the Data Link Layer address of the IP server into the packet.

20. The method of claim 14, further comprising:
    receiving a packet in the network flow switch from one of the IP servers;
    extracting a destination address from the packet; and
    routing the packet to a network destination based on the destination address of the packet.

21. The method of claim 20, wherein routing the packet does not require intervention by a processor of the network flow switch.

22. The method of claim 14, wherein an IP payload of the packet is encrypted.

23. The method of claim 14, wherein the packet is encoded according to an ISO layer 4 transport protocol other than TCP.

24. A computer program for controlling a network flow switch, wherein the switch routes packets to and from a plurality of IP servers, the switch comprising:
    a processor executing the computer program;
    a memory connected to the processor; and
    a plurality of network ports connected to a network;
    the computer program comprising instructions for:
      receiving a packet on one of the network ports of the network flow switch; and
      routing the packet to at least one of the IP servers by writing the Data Link Layer address of the IP server into the packet in the network flow switch, each of the IP servers having a same IP address and a Data Link Layer address that differs from the Data Link Layer address of the other IP servers.

25. The computer program of claim 24, further comprising instructions for routing the packet to a second IP server if a first IP server is disabled.

26. The computer program of claim 24 wherein the instructions for routing the packet to a second IP server further comprise instructions for writing the Data Link Layer address of the second IP server into the packet.

27. The computer program of claim 24 further comprising instructions for routing the packet to an IP server having an optimal workload.

28. The computer program of claim 24 wherein the instructions for routing the packet to the IP server further comprise instructions for writing the Data Link Layer address of the IP server into the packet.

29. The computer program of claim 24 further comprising instructions for:
    receiving a packet on one of the network ports of the network flow switch from one of the IP servers; and
    routing the packet to a network destination based on a destination address of the packet.

30. The computer program of claim 24, wherein the packet is encrypted.

31. The computer program of claim 24, wherein the packet is encoded according to an ISO layer 4 transport protocol other than TCP.

32. A method for performing fault-tolerant routing of packets to and from one of a plurality of IP servers, the method comprising:

transmitting one or more packets from a client connected to a network to a network router;

continuously monitoring in a network flow switch a status of each of the plurality of IP servers having a same IP address and a Data Link Layer address that differs from the Data Link Layer address of the other IP servers; and     routing the packets through the network flow switch from the network router to one of the plurality of IP servers in an operational status.

33. The method of claim 32, wherein the plurality of IP servers are configured with a same IP address.

34. The method of claim 32, wherein IP payloads of the packets are encrypted.

35. The method of claim 32, wherein the packets are encoded according to an ISO layer 4 transport protocol other than TCP.

* * * * *